(12) United States Patent
Jardine

(10) Patent No.: US 6,451,880 B1
(45) Date of Patent: Sep. 17, 2002

(54) WORKABILITY AND BOARD LIFE IN MASONRY MORTAR AND METHOD FOR OBTAINING SAME

(75) Inventor: Leslie A. Jardine, Salem, MA (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

(21) Appl. No.: 09/856,519

(22) PCT Filed: Oct. 26, 1999

(86) PCT No.: PCT/US99/24996

§ 371 (c)(1),
(2), (4) Date: May 21, 2001

(87) PCT Pub. No.: WO00/31174

PCT Pub. Date: Jun. 2, 2000

Related U.S. Application Data

(60) Provisional application No. 60/109,513, filed on Nov. 23, 1998.

(51) Int. Cl.[7] .......................... C08K 5/09; C08K 5/053; C08L 33/04; C04B 24/06
(52) U.S. Cl. .......................... 524/5; 524/560; 524/561; 524/320; 524/366; 526/320; 526/328
(58) Field of Search .......................... 524/5, 560, 561, 524/320, 366; 526/320, 328

(56) References Cited

U.S. PATENT DOCUMENTS

| | | | |
|---|---|---|---|
| 3,037,952 A | 6/1962 | Jordan et al. ............... 260/29.6 |
| 3,865,601 A | 2/1975 | Serafin et al. ............... 106/95 |
| 3,885,985 A | 5/1975 | Serafin et al. ............... 106/315 |
| 4,338,239 A | 7/1982 | Dammann .................. 524/549 |
| 4,375,987 A | 3/1983 | Lange et al. .................. 106/95 |
| 4,464,524 A | 8/1984 | Karickhoff .................. 526/313 |
| 4,477,623 A | 10/1984 | Pons et al. .................. 524/710 |
| 4,514,552 A | 4/1985 | Shay et al. .................. 526/301 |
| 4,529,773 A | 7/1985 | Witiak et al. ............... 524/558 |
| 4,542,181 A | 9/1985 | Schuppiser et al. ......... 524/560 |
| 4,600,761 A | 7/1986 | Ruffner et al. ............... 526/270 |
| 4,616,074 A | 10/1986 | Ruffner ...................... 526/318 |
| 4,663,385 A | 5/1987 | Chang et al. ............... 524/523 |
| 4,876,313 A | 10/1989 | Lorah ........................ 525/281 |
| 4,916,171 A | 4/1990 | Brown et al. ............... 523/161 |
| 5,266,646 A | 11/1993 | Eisenhart et al. ........... 525/301 |
| 5,294,256 A | 3/1994 | Weigand et al. ............ 106/819 |
| 5,314,977 A | 5/1994 | Amick et al. ............... 526/286 |
| 5,326,843 A | 7/1994 | Lorah et al. .............. 526/318.6 |
| 5,328,952 A | 7/1994 | Brodnyan et al. .......... 525/301 |
| 5,348,993 A | 9/1994 | Daeumer et al. ............ 524/44 |
| 5,385,971 A | 1/1995 | Sauer et al. ................ 524/558 |
| 5,403,894 A | 4/1995 | Tsai et al. ................... 525/285 |
| 5,451,641 A | 9/1995 | Eisenhart et al. ........... 525/301 |
| 5,519,084 A | 5/1996 | Pak-Harvey et al. ........ 524/503 |
| 5,782,972 A | 7/1998 | Abelleira et al. ........... 106/696 |
| 6,172,147 B1 | 1/2001 | Abelleira et al. ............. 524/95 |

FOREIGN PATENT DOCUMENTS

| | | | |
|---|---|---|---|
| BR | 880321 | 2/1990 | ................... 33/12 |
| DE | 4440236 | 5/1996 | |
| EP | 0216479 | 4/1987 | |
| EP | 0348565 | 1/1990 | |
| EP | 0654454 | 5/1995 | ................... 24/26 |
| JP | 6283346 | 4/1987 | ..................... 2/20 |
| JP | 1164747 | 6/1989 | ................... 24/26 |
| JP | 1172250 | 7/1989 | ................... 24/26 |
| JP | 6100344 | 4/1994 | ................... 24/26 |

OTHER PUBLICATIONS

"Solid Grade Acrylic Cement Modifiers", Min–Chi Tsai, Mary J. Burch and Joseph A. Lavelle, 1993.
Rohm and Haas Company, ACRYSOL® TT–615, Alkali Swellable Acrylic Associative Thickner for Textile Formulations, Specialty Industrial polymers, USA, Mar. 1995, 1992, Feb., 1983, 16 pages.

*Primary Examiner*—James J. Seidleck
*Assistant Examiner*—Olga Asinovsky
(74) *Attorney, Agent, or Firm*—Craig K. Leon; William L. Baker

(57) ABSTRACT

Improved workability and board life in masonry mortar is achieved through the use of an alkali soluble emulsion polymer and a low molecular weight, water-soluble humectant comprising a polymer having oxyalkylene groups, polyhydric groups, or a mixture thereof. The humectant in combination with a pH-sensitive polymer which provides significant advantages over the polymer alone. Preferably, the molecular weight of the humectant is approximately 2500 or lower. Exemplary masonry mortar compositions and methods for modifying them are also disclosed.

27 Claims, No Drawings

WORKABILITY AND BOARD LIFE IN MASONRY MORTAR AND METHOD FOR OBTAINING SAME

This application was filed under section 371 based on PCT/US99/24996, filed Oct. 26, 1999, which is based on U.S. Ser. No. 60/109,513 filed Nov. 23, 1998.

FIELD OF THE INVENTION

The present invention relates to additives for masonry mortar and compositions comprising such admixtures, and more particularly to improving workability, board life, and water retention in masonry mortar using a low molecular weight, water soluble humectant comprising a polymer having oxyalkylene groups, alcohol groups, oxyalkylene adducts of monoalcohols and/or polyols, or mixtures thereof in combination with an alkali-soluble, emulsion polymer.

BACKGROUND OF THE INVENTION

Masonry mortar is a combination of hydratable cement or cementitious binder, fine aggregate (e.g., sand), and water which is used for binding together masonry units, such as bricks and masonry blocks, into a building structure.

Among the characteristics of masonry mortar which are of central concern to masons are "workability" and "board life." Workability refers to the consistency and feel of the mortar when it is being trowelled and applied by the mason. Masons prefer that their mortars have a particular ease of movement, a certain plasticity or "fattiness," that makes for easy application, while also having a certain degree of "body" or cohesiveness that means that the mortar holds together. Board life, on the other hand, refers to the working time or duration in which the mortar retains workability.

The present inventor also believes that water retention is a further desirable feature and benefit that should be provided by the masonry mortar additive, because this contributes to enhancing workability and board life.

It is one of the purposes of the present invention to provide an improved additive for enhancing workability, board life, and water retention in masonry mortar.

SUMMARY OF THE INVENTION

An exemplary masonry additive of the invention comprises: (a) an alkali-soluble, emulsion polymer; and (b) a low molecular weight, water-soluble humectant comprising a polymer having oxyalkylene groups, polyhydric monoalcohol and/or polyolgroups, or a mixture thereof. An exemplary humectant comprises a polymer comprising at least one oxyalkylene group, and preferably an alkylene or oxyalkylene glycol; an oxyalkylene ether adduct of mono alcohols or polyols; or a mixture thereof.

One preferred humectant contemplated for use as a suitable water-soluble humectant comprises polyethylene glycol (PEG) having the formula H—(OCH$_2$CH$_2$)$_n$—OH wherein "n" represents an integer of 3 to 90, and more preferably 3–70, and most preferably 3–55. The humectant is preferably added with the alkali soluble emulsion polymer together into a masonry cement, or it may be added into a masonry cement as a separate liquid component added simultaneously with the alkali soluble emulsion polymer (component (a)) or introduced at a different time. The component (a) alkali-soluble emulsion polymer is preferably hydrophobically-modified. The use of a low molecular weight, water-soluble humectant provides a substantial improvement over masonry mortar containing the emulsion polymer alone.

The present invention also provides a masonry mortar composition (e.g., comprising a hydratable cementitious binder and fine aggregate (e.g., sand) and the above described component (a) alkali-soluble emulsion polymer and component (b) low molecular weight, water-soluble humectant. The invention also provides a method for enhancing workability, boardlife, and water retention in a masonry mortar, comprising introducing to a cement binder, fine aggregate, the polymer of component (a), and the low molecular weight, water-soluble humectant of component (b).

Preferred masonry mortars of the invention have an entrained air content of 6–25% by volume, and more preferably 8–22% by volume (ASTM C 91)(1998).

Further features and advantages of the invention are described in further detail hereinafter.

DETAILED DESCRIPTION OF EXEMPLARY EMBODIMENTS

The term "masonry mortar" as used herein refers to a composition containing a hydratable cementitious binder (e.g., Portland cement, gypsum, ground limestone, slag, lime, and various other pozzolans) and fine aggregate (e.g., sand) in a general range (binder: fine aggregate) of 1:2 to 1:8 by dry weight. The "masonry mortar" composition of the invention encompass the mix in dry and wet forms.

As previously discussed in the background, the present invention is directed at improving workability, board life, and water retention in masonry mortar. Mortar workability enhancers, such as hydroxyethyl cellulose, or high molecular weight PEG, are known for adding viscosity and water binding (humectant) quality which produces a desirable consistency or "fattiness" of the mortar paste. However, hydroxyethyl cellulose is in the form of a powder, and this is not desirable because this creates problems when dispensing the additive into the mortar. It is more desirable to use additives that can be added in the form of a liquid because this is more accurately dosed and more easily dispensed, for example, during intergrinding of the cementitious binder. Liquids can also be formulated in a single component system with grinding aids, set modifiers (e.g., accelerators, retarders), and/or air entraining agents (AEAs). Thus, another benefit of the present invention is achieving workability through a viscosifying and wetting ability in an additive that is introduced in a high solids/low viscosity liquid form and thus can be more accurately dosed and dispense. This approach is therefore considered by the inventor to be far superior to powdered additives.

Another objective met by the present invention was to produce the desired "water binding quality" or creaminess desired by masons without having the workability-enhancing additive function as a water-reducer or "superplasticizer. To the contrary, the present inventor sought a liquid additive that had a "water holding" power that would both increase workability and extend board life, without functioning as a water-reducer.

It is believed that the use of low molecular weight, water-soluble humectants, (such as PEG) of molecular weight 100–2500 may also have benefits in improving grindability of cement clinker and limestone.

Thus, the present inventors discovered a desirable synergy of characteristics by employing (a) an alkali-soluble emulsion polymer (preferably one which is hydrophobically modified by incorporation of one or more fatty acid groups or moieties); and (b) a low molecular weight, water-soluble humectant selected from (i) an alkylene or oxyalkylene glycol or (ii) oxyalkylene ether adducts of alcohols, or polyols.

The molecular weight of these humectants may be up to 4000 and more preferable up to 2500. The glycol can be represented by the formula $HO(AO)_nH$ where A represents a $C_2$–$C_{10}$ alkylene group, such as ethylene, propylene, butylene and the like, with mixtures of ethylene and propylene being preferred, and ethylene by itself being most preferred; O represents an oxygen atom and "n" represents an integer from 3 to 90 and more preferably 3–55. The AO groups in a particular glycol molecule may all be the same or may be different. Exemplary glycols (e.g., polyalkylglycols) therefore may include poly(oxyalkyelne) glycol, having molecular weights of 100 to about 2500. The AO groups forming the chain of such glycols may contain a single type of alkylene ether group or a mixture of alkylene ether groups which may be in block or random arrangement.

The oxyalkylene compounds used in forming the present admixture can also be oxyalkylene ether adducts of mono alcohols or polyols. The oxyalkylene adduct of monoalcohols is represented by the formula $RO(AO)_mH$ wherein R is hydrocarbon group, such as a $C_1$–$C_7$ alkyl group. Examples of such R groups are believed suitable for use in the invention include methyl, ethyl, propyl, isopropyl, n-butyl, isobutyl, t-butyl, n-pentyl, isopentyl and the like. The preferred R groups are $C_3$–$C_5$ alkyl such as n-propyl, isopropyl, n-butyl, t-butyl, and the like. A is a $C_2$–$C_4$ (preferably $C_2$–$C_3$) alkylene group, such as ethylene, propylene, and the like, and mixtures thereof in the same chain, and "m" represents an integer of from 1 to about 10.

The oxyalkylene adduct of polyols are represented by the formula $Q[(OA)_p\text{—}OR']_x$, wherein Q represents a hydrogen or $C_3$–$C_{12}$ group. R' independently represents a hydrogen atom, a $C_1$–$C_7$ group, or mixture or $C_1$–$C_7$ alkyl, with the proviso that at least one R' group represents a $C_2$–$C_5$ alkyl group, A represents a $C_2$–$C_4$ alkylene group (and more preferably a $C_2$–$C_3$ alkylene group), or mixtures thereof, O represents an oxygen atom, "p" represents an integer of from 0 to 10, and "x" represents an integer of from 2 to 5.

Illustrative oxyalkylene adducts of polyols, as exemplary humectants of the present invention, can be derived from $C_3$–$C_{12}$ aliphatic triols, such as glycerol, 1,2,4-butanetriol, 2,3,4-pentanetriol, 2-ethyl-2-(hydroxymethyl)-1,3-butanetriol, 2,3,4-pentanetriol, 2-ethyl-2-(hydroxymethyl)-1,3-propanetriol (trimethylol propane), 1,1,1-tris (hydroxymethyl)ethane, 1,2,6-trihydroxyhexane, 1,2,3-heptanetriol, and the like, $C_4$–$C_{12}$ aliphatic tetrols (e.g., 2,3,4,5-hexanetetrol), sorbitan, erythritol, pentaierythritol), $C_5$–$C_6$ sugar alcohols (including those compounds corresponding to the formula $(HOCH_2(CHOH)_nCH_2)H$ wherein n is 3 to 6 such as in xylitol, arabitol, mannitol, and the like), monosaccharides (e.g., erythrose, threose, ribose, arabinose, xylose, lyxose, allose, altrose, glycose, mannose, gulose, idose, galactose, fructose, galactose, and the like), disaccharides (e.g., sucrose, lactose, maltose) and alkyl glycosides (e.g., methyl glycosides, ethyl glycosides, propyl glycosides, and other glycoside molecules wherein the alkyl glycoside is an acetal formed by interaction of a $C_1$–$C_{20}$ alcohol with a carbonyl group of a mono- or a disaccharide such as glucose). Also suitable for use as the polyol are polysaccharides such as cellulose, hydroxycellulose, as well as hydroxy-containing substances such as, oxetane oligomers, sorbitol oligomers, glycerol oligomers, and the like.

Where there are more than one alkyl group represented by R' above, preferably the R's are the same alkyl group. Illustratively, R' maybe methyl, ethyl, propyl, isopropyl, n-butyl, isobutyl, t-butyl, amyl, and t-amyl. R' is preferably a $C_1$–$C_4$ alkyl group.

Further exemplary polyol components which are contemplated for use in the low molecular weight, water-soluble humectant component of the invention have the formula

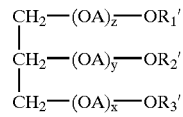

where $R_1$, $R_2$, and $R_3$ are each hydrogen or a $C_1$–$C_7$ alkyl group with the proviso that at least one of $R_1'$, $R_2'$, or $R_3'$ is a $C_1$–$C_7$ alkyl group, A is $C_2$–$C_4$ alkylene group and x, y, and z are each selected from an integer from 0–10. Preferably Z. and $Z_3$ are the same alkyl group, such as methyl, ethyl, propyl, isopropyl, n-butyl, isobutyl, t-butyl, amyl, t-amyl, hexyl, heptyl, octyl, nonyl, decyl, and the like. Most preferably, $R_1$ and $R_3$ are the same $C_4$–$C_5$ tertiary alkyl group. Mixtures can be employed including mixtures of additives with different alkyl groups and/or different oxyalkylene groups; mixtures of 1,2-diether, 1,3-diether and 1,2,3,-triether are preferred.

In the case of the derivatives of glycerin, preferred components of the subject admixture are those having the following formula:

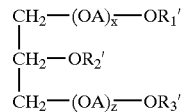

wherein $R_1$ and $R_3$ are $C_1$–$C_7$ alkyl groups, preferably t-butyl or t-amyl groups, $R_2$ is hydrogen, x and z are each 4–10 and Z is ethylene, propylene, or a mixture thereof. The preparation of such materials is shown, for example, in U.S. Pat. Nos. 2,932,670; 2932,616; and 4,241,224.

A preferred humectant comprises polyethylene glycol (PEG) having the formula $H\text{—}(OCH_2CH_2)_n\text{—}OH$ wherein n=3–2500 and more preferably 3–55. The use of low molecular weight humectant provides a significant improvement over the alkali soluble emulsion polymer used alone.

Another preferred humectant comprises hydroxy-modified cellulose ether (or hydroxyethylcellulose). These polymers may comprise, for example, 6-carbon rings joined by ether linkages, the rings having 1–6 alcohol groups (such as —$CH_2$—$CH_2$—OH groups).

With respect to the other component, the alkali-soluble emulsion polymer (component a), the term "alkali-soluble" as used herein means and refers to an emulsion polymer or copolymer, at least a portion or stage thereof having a solubility in an alkaline environment, generally at pH of 6.5 and higher, which exceeds the solubility of the polymer at low pH (e.g., in acidic environments).

An exemplary alkali-soluble emulsion polymer suitable for use in masonry mortar was disclosed in U.S. Pat. No. 5,782,972 of Abelleira et al. which is fully incorporated herein by reference. Abelleira et al. disclosed a mortar additive comprising a multi-stage polymer having two or more polymer stages wherein:

(A) at least one of said polymer stages is an ionically-soluble polymer, the ionically-soluble polymer being polymerized from a monomer mixture comprising:
(a) about 0.1 to about 55% by weight hydrophobic monomer having the formula

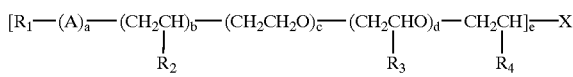

where A

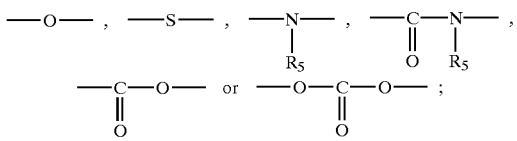

$R_1$ and $R_5$ independently are $(C_1–C_{30})$ alkyl, a (mono, di-, or tri-) $(C_1–C_{30})$ alkyl-substituted phenyl ring, or a sorbitan fatty ester; $R_2$, $R_3$ and $R_4$ independently are —H or $(C_1–C_{10})$ alkyl, aryl or alkylaryl; a is 0 or 1; b is 0 to 50; c is 0 to 150; d is 0 to 50; e is equal to or greater than 1 and X is a group containing at least one ethylenic double bond;

(b) about 10 to about 69% by weight $(C_3–C_{30})$ ethylenically-unsaturated, ionizable monomer, and (c) about 0.1 to about 90% by weight nonionic $(C_2–C_{30})$ ethylenically-unsaturated monomer, and (d) 0 to about 10% by weight multi-functional compounds;

(B) the ionically-soluble polymer is physically or chemically attached to the polymer particle such that, upon neutralizing the ionically-soluble polymer with base or acid, at least a portion of said ionically-soluble polymer remains attached to the remainder of the polymer particle; and (C) the ionically-soluble polymer comprises from about 1% to about 99% by weight of the polymer particle.

Such a multi-stage polymer, which comprises at least one hydrophobically-modified, ionically-soluble polymer stage is disclosed in U.S. Pat. No. 5,451,641 assigned to Rohm and Haas Company, Philadelphia, Pa. A suitable polymer is commercially available from Rohm and Haas under the tradename ACRYSOL® TT-165. The multi-stage polymer is an alkali-soluble acrylic polymer emulsion, which is typically used for textile formulations, such as for paper, textiles, and nonwovens, although it is also sold for pigmented caulks.

It is believed that other known alkali-soluble emulsion polymers (which are sometimes referred to as "core shell polymers") are suitable for use as component "(a)" in the present invention: provided that they can be added to the masonry mortar in a liquid form; and provided that they function to increase viscosity (i.e. thicken) when in the alkaline environment of the masonry mortar.

It is believed that known "core shell polymers," having an alkali-insoluble core and an alkali-soluble shell, may be suitable for use as the alkali-soluble emulsion polymers in the present invention. For example, alkali-soluble emulsion polymers, to the extent that they function in the above-described manner in masonry mortar, might be found among the following patents: U.S. Pat. No. 4,477,623 of Pons et al. (aqueous dispersion containing a water-insoluble addition polymer formed from copolymerizing an unsaturated monomer such as styrene or acrylates, and an alkali soluble copolymer consisting of acrylates or methacrylates and unsaturated carboxylic acid units); U.S. Pat. No. 4,876,313 of Lorah (core-shell polymer having an alkali-insoluble core and an alkali-soluble shell; shell is polymerized from a mixture of monomers comprising acid or anhydride containing unsaturated monomer); U.S. Pat. No. 4,916,171 of Brown et al. (core-shell polymer having an alkali-insoluble emulsion polymer core and an alkali-soluble emulsion polymer shell; monomers, polymerized to make both core and shell, include acrylates, acrylonitrile, acrylic and maleic acids, stryene, and other $C_1–C_{12}$ alkyl acrylates); U.S. Pat. No. 5,326,843 of Lorah et al. (low molecular weight alkali-soluble copolymer of water insoluble monoethylenically unsaturated aromatic monomer and methacrylic acid); U.S. Pat. No. 5,328,952 of Brodnyan et al. (composition of alkali-insoluble emulsion polymer and an alkali-soluble polymer, a first stage being made from alkyl acrylates or methacrylate and up 30 to 10% carboxylic acid, and a second stage being made from alkyl acrylate or methacrylate, carboxylic acid, and hydroxyalkyl ester of a carboxylic acid); and U.S. Pat. No. 5,451,641 of Eisenhart et al. (described further below); all of which are incorporated fully herein by reference.

In U.S. Pat. No. 5,451,641, Eisenhart et al. describe pH-responsive thickeners which are generally based upon the incorporation of a hydrophobic surfactant monomer into a hydrophilic, polymeric backbone. The traditional backbone composition for these thickeners primarily included a monomeric acid, such as acrylic or methacrylic acid, and an alkyl acrylate or methacrylate, such as ethyl acrylate. The hydrophobic surfactant component is primarily derived from a polyethyoxylated alkyl group. Thus, pH-responsive thickeners and various linkages connecting the hydrophobic surfactant component to the polymer backbone are generally known, See e.g., U.S. Pat. No. 5,451,641 (particularly Column 2, lines 7–53), incorporated fully herein by reference.

Liquid emulsion polymers are believed to be suitable in the present invention because they contribute viscosity and body to masonry mortar, allowing the addition of further water which increases workability and board life.

To improve masonry mortars incorporating an alkali-soluble emulsion polymer (component (a)), the present invention preferably employs as a humectant a low molecular weight polyethylene glycol (PEG) having the formula H—$(OCH_2CH_2)_n$—OH wherein n=3–2500. In more preferred embodiments, n is 3–500, and most preferred is n=3–55 (at mw=55, the molecular weight of the PEG is approximately 2400). The use of a liquid additive, with low molecular weight PEG in solution, is advantageous because unnecessary viscosity is avoided prior to addition of the additives into the masonry mortar. For example, one advantage of this novel combination is that they can be added as a low-viscosity, easily pumpable solution at relatively low addition volume.

It is noted by the present inventor that U.S. Pat. No. 4,218,258 teaches the use of high molecular weight ranges for PEG, in the neighborhood of 400,000 to 4,000,000; and it is believed that this would require the use of a powdered additive which is not suitable for the present application, because it would create problems in dispensing the additive. It is inherently inconvenient for applicators to transport, open, measure, dispense and blend dry powder into masonry mortar.

The use of low molecular weight PEG as a separate liquid component means that the combination of (a) alkali-soluble emulsion polymer and (b) PEG can be added with relatively greater accuracy in the form of a low-viscosity, high-solids liquid (instead of a powder or thick syrup with low solids), and this poses fewer material handling problems to masons.

Masonry mortar compositions of the invention, therefore, comprise a hydraulic cement binder, a fine aggregate (sand), and the above-described (a) alkali-soluble emulsion polymer and (b) the above-described low molecular weight, water-soluble humectant (e.g., low molecular weight PEG), the components (a) and (b) having been added in liquid form (in contrast to powder form). An exemplary mortar additive composition can be made by combining the following ingredients in the following relative amounts: the emulsion polymer, for example, in an amount of 0.005–0.10% by weight based on the weight of the cement, and more preferably about 0.015–0.10% by weight cement; the humectant (e.g., PEG) in the amount of 0.005 to 0.35% based on the weight of cement, and more preferably 0.01–0.2% based on the weight of cement. Masonry and Mortar cement, and the mortars prepared by these materials are described in ASTM C1329 (1998) or ASTM C91 (1998).

An exemplary masonry mortar may comprise the following components (based on total dry weight): cementitious binder (5 to 70%); fine aggregate (25 to 95); component (a) alkali-soluble emulsion polymer (0.00025–0.07%); and component (b) humectant (e.g., low molecular weight PEG) (0.00025 to 0.25%, and more preferably 0.07 to 0.245%).

In further exemplary embodiments of the present invention, conventional air-entraining agents (AEAs) may be used, along with the alkali-soluble emulsion polymer and humectant, further to enhance workability. Conventional AEAs include nonionic AEAs such as fatty alkanolamides, ethoxylated fatty amines, ethoxylated fatty acids, ethoxylated triglycerides, ethoxylated alkylphenols, ethoxylated alcohols, alkyl ethoxylates, alkylaryl ethoxylates; cationic AEAs such as amine ethoxylates and amine oxides; amphoteric AEAs such as betaines; and anionic AEAs such as fatty alkyl ether sulfates, fatty alkylaryl ether sulfates, alkyl benzene sulfonates, sulfosuccinates, and fatty sulfonates. AEAs useful in the present invention should be soluble at a pH range of 3–6 to obtain solubility in the cementitious mixture, and must also be soluble at a pH of 10–11 and above in view of the hydration process taking place in the mortar. The AEA should thus preferably have wide solubility range. One suitable AEA that is believed useful in the present invention is commercially available from Rhone Poulenc under the tradename CYCLOMIDE DC 212/S. The amount of AEA used will depend on the nature of the alkali-soluble emulsion polymer used, although the amount of AEA might typically range from 0 to 0.02 wt % s/s cem.

In still further exemplary embodiments of the present invention, conventional set retarders may also be employed. Conventional set retarders include carbohydrates such as monosaccharides, for example, glucose and fructose; gluconic acid, heptoglycanic acid, and their salts (e.g., gluconate); disaccharides, for example, raffinose; polysaccharides, for example, starch and cellulose as well as dervishes thereof, such as pregelatinized starch, dextrin, corn syrup and carboxymethylcellulose; polyhydroxy polycarboxylic compounds, such as tartaric acid and mucic acid; lignosulfonic acid and salts thereof such as calcium, magnesium, ammonium and sodium lignosulfonate; water-soluble salts of boric acid, such as the alkali metal salts thereof; zinc oxide, and water-soluble silicone compounds; as well as mixtures thereof. Other set retarders may include polyphosphates, such as sodium tripolyphosphate and potassium tripolyphosphate. Another preferred retarder is sucrose. Set retarders can be used in an amount of about 0–40% by weight in the solution. An maximum preferred amount is about 0.2% based on weight of cement in the masonry mortar.

An exemplary method of the present invention comprises adding to a mortar cement (such as during the intergrinding of the cement at the mill, or added after the grinding process, such as during formulation of the mortar) the above-described alkali-soluble emulsion polymer component (a) and the above-described low molecular polyethylene glycol. One could incorporate the emulsion polymer, for example, in an amount of 0.005–0.10% by weight based on the weight of the cement, and more preferably about 0.015–0.10% by weight cement; the PEG in the amount of 0.005 to 0.35% based on the weight of cement, and more preferably 0.01–0.2% based on the weight of cement; and optionally an air entraining agent, which is preferably in an amount of 0.001–0.02% based on the weight of the cement; and/or optionally a set retarding agent that is preferably in the amount of 0 to 0.2% based on the weight of cement.

It is also possible that addition of the components may be achieved in a one-time introduction of the components, which can be premixed together as a single combination additive (such as an emulsion having 20–80% by wt. of water), or which can be added separately during the manufacture of the mortar cement into the cement mix.

The foregoing description and example set forth are intended for illustrative purposes only, and not to limit the scope of the invention.

EXAMPLE 1

Two sample masonry mortars were tested. Both samples contained an acrylic alkali-soluble emulsion polymer operative to increase viscosity of the mortar at alkaline pH levels. This was a hydrophobically-modified emulsion polymer in combination with an air entraining agent, (and a retarder), a combination that is available from Grace Construction Products, Cambridge, Mass., under the tradename HYDRONIX L6 (also sold by Grace under the tradename TYTRON). The control sample did not contain PEG, while the second sample contained PEG having a molecular weight of 200 and used in an amount of 0.5 pounds/ton of cement. When a skilled mason tested both samples, he noted that the control sample (without PEG) showed definite stiffening (thus signaling end of optimal mortar life) after 45 minutes, while the second sample (with PEG) showed definite stiffening after 75 minutes. The second sample (with PEG) had demonstrably better workability, and maintained this workability over a total board life of 90 minutes, in contrast to the control sample (without PEG) which had a total board life of 60 minutes. Overall, it was observed that the sample with PEG had better plasticity and better "fatty" character (which signified that it had better body or creaminess). This sample was also characterized by an industry professional as having a unique "slickness."

EXAMPLE 2

The foregoing comparison test was repeated using diethylene glycol (DEG) instead of polyethylene glycol. There were no differences in workability or board life detected between the control sample (without any glycol) and second sample (with DEG).

EXAMPLE 3

The test of example 1 was repeated using a PEG having molecular weights ranging from 5000 to 100,000. At these slightly higher weight ranges, a similar board life and initial stiffening time was observed, but the workability, while somewhat improved, compared to the reference with Hydronix L6 alone, was felt to be inferior to sample number 2 (lower molecular weight PEG) as described in Example 1.

The foregoing discussion and example was provided for illustration only and are not intended to limit the scope of the invention, as claimed.

EXAMPLE 4

Three mortar or masonry cements were produced in a cement plant with all additives interground into the cement mill. All mortar cements contained an air entraining agent and a retarder. Cement 1 also contained the acrylic alkali-soluble emulsion polymer. Mortar with this cement had air of 10.5% and a discard time of 135 minutes. Cement 2 also contained the acrylic alkali-soluble emulsion polymer plus the polyethylene glycol polymer. Mortar with this cement had air of 9.5% and a discard time of 195 minutes, which allows the masons a longer permissible working time. Mortar with masonry cement 3 with no additional polymers had air of 16.5% and a discard time of 150 minutes.

An advantage of using the acrylic alkali-soluble emulsion polymer plus the polyethylene glycol is that the working life of the low air mortar is longer than that of high air mortar without these materials. Masons have traditionally relied upon air entrainment for good workability and long working life of the mortar. Low air is desirable because it allows for a mortar of higher strength. Thus, the mortar of the invention provides a good strength without sacrificing workability.

It is claimed:

1. An additive for improving workability and boardlife in masonry mortar, comprising:
   an alkali soluble emulsion polymer having two or more polymer stages wherein:
   (A) at least one of said polymer stages is an ionically-soluble polymer, the ionically-soluble polymer being polymerized from a monomer mixture comprising:
       (a) about 0.1 to about 55% by weight hydrophobic monomer having the formula

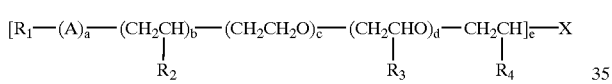

where A is

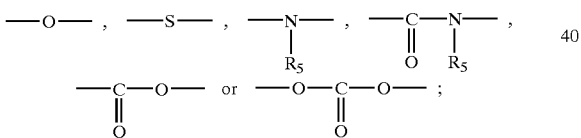

wherein $R_1$ and $R_5$ independently represent a $(C_1-C_{30})$ alkyl group, $(C_1-C_{30})$ alkyl-substituted phenyl ring, or a sorbitan fatty ester; $R_2$, $R_3$ and $R_4$ independently represent hydrogen or $(C_1-C_{10})$ alkyl, aryl or alkylaryl group; "a" represents 0 or 1; "b" represents an integer from 0 to 50; "c" represents an integer from 0 to 150; "d" represents an integer from 0 to 50; "e" represents an integer equal to or greater than 1, and X represents a group containing at least one ethylenic double bond;
       (b) about 10 to about 69% by weight of $(C_3-C_{30})$ ethylenically-unsaturated, ionizable monomer, and
       (c) about 0.1 to about 90% by weight nonionic $(C_2-C_{30})$ ethylenically-unsaturated monomer, and
       (d) 0 to about 10% by weight multi-functional compounds;
   (B) the ionically-soluble polymer is physically or chemically attached to the polymer particle such that, upon neutralizing the ionically-soluble polymer with base or acid, at least a portion of said ionically-soluble polymer remains attached to the remainder of the polymer particle; and
   (C) the ionically-soluble polymer comprises from about 1% to about 99% by weight of the polymer particle; and
   said additive further comprising, in addition to said alkali-soluble emulsion polymer, a water-soluble humectant having a molecular weight of 100–2500 and comprising a polyoxyalkyene glycol, a polyoxyalkylene adduct of polyols, a polyvinyl alcohol, a hydroxy-modified cellulose ether, or mixture thereof.

2. The additive of claim 1 wherein said humectant comprises polyethylene glycol.

3. The additive of claim 1 wherein said humectant comprises a polyoxyalkylene glycol, wherein said polyoxyalkylene glycol is polyethylene glycol having the formula $H\text{—}(OCH_2CH_2)_n\text{—}OH$ wherein n=3–55.

4. The additive of claim 1 wherein said humectant comprises a polyoxyalkene glycol having the formula $H\text{—}(OA')_n(OA'')_p\text{—}OH$ wherein A' represents an ethyl group; "n" represents an integer from 3 to 55; A" represents a propyl group; and "p" represents an integer from 0 to 10.

5. The additive of claim 1 wherein said humectant comprises at least one oxyalkylene glycol, oxyalkylene ether glycol, or mixtures thereof 100–2500.

6. The additive of claim 1 wherein said humectant comprises an oxyalkylene compound selected from:
   (i) oxyalkylene glycols represented by the formula $HO(AO)_nH$ wherein A represents a $C_2-C_4$ alkylene group, O represents an oxygen atom, and n represents an integer of from 1 to about 55;
   (ii) oxyalkylene adducts of monoalcohols represented by the formula $RO(AO)_mH$ wherein R represents a $C_1-C_7$ alkyl group, A represents a $C_2-C_4$ alkylene group, O represents an oxygen atom and m represents an integer from 1 to about 55;
   (iii) oxyalkylene adducts of polyols represented by the formula $Q[(OA)_pOR']_x$ wherein Q represents a $C_3-C_{12}$ hydrocarbon group, each R' independently represents a $C_1-C_7$ alkyl group or hydrogen atom provided at least one R' of said adduct represents a $C_1-C_7$ alkyl group; A represents a $C_2-C_4$ alkylene group; O represents an oxygen atom; "p" represents an integer of from 1 to about 10; and "x" represents an integer of from 3 to 5; and
   (iv) mixtures of said oxyalkylene compounds.

7. The additive of claim 2 wherein said humectant comprises at least one oxyalkylene glycol represented by the formula $HO(AO)_nH$ wherein A represents a $C_2-C_{10}$ alkylene group, O represents an oxygen atom, and "n" represents an integer of at least 3.

8. The additive of claim 2 wherein said humectant comprises at least one oxyalkylene adduct of monoalcohols represented by the formula $RO(AO)_mH$ wherein R is a $C_1-C_7$ alkyl group, A is a $C_2-C_4$ alkylene group, and "m" represents an integer of from 1 to 10.

9. The additive of claim 2 wherein said humectant comprises at least one oxyalkylene adduct of polyols represented by the formula $Q[(OA)_pOR']_x$ wherein Q represents a hydrogen or $C_3-C_{12}$ group, R' represents a hydrogen atom or $C_1-C_7$ group, A represents a $C_2-C_4$ alkylene group, and "p" represents an integer of 0 to 10, and "x" represents an integer from 3 to 5.

10. The additive of claim 1 wherein said alkali soluble emulsion polymer and said water-soluble humectant are combined together in liquid form, and are present in a ratio of 1:70 to 20:1 based on total dry weight solids.

11. The additive of claim 1 further comprising an air entraining agent.

12. The additive of claim 1 further comprising a set retarder.

13. The additive of claim 11 further comprising a set retarder.

14. The additive of claim 1 wherein said alkali soluble emulsion polymer and said water-soluble humectant are combined together in a hydratable cementitious composition.

15. The additive of claim 14 wherein said hydratable cementitious composition further comprises a hydratable cementitious binder and a fine aggregate.

16. A masonry mortar composition comprising masonry mortar and the additive of claim 1.

17. The masonry mortar composition of claim 16 wherein said humectant comprises a low molecular weight polyethylene glycol having the formula H—$(OCH_2CH_2)_n$—OH wherein n represents an integer from 3 to 55, said glycol having a molecular weight of 100–2500.

18. The masonry mortar composition of claim 17 further comprising an entrained air content of 6–25% by volume.

19. The masonry mortar composition of claim 16 wherein said alkali soluble emulsion polymer is present in an amount of 0.005–0.10% by weight based on the weight of the cement and said water-soluble humectant is present in an amount of 0.005 to 0.35% based on the weight of cement.

20. The masonry mortar composition of claim 18 wherein the ratio of said alkali soluble emulsion polymer and said water-soluble humectant is from 1:70 to 20:1 by weight based on total solids.

21. The masonry mortar composition of claim 14 wherein said alkali soluble emulsion polymer is hydrophobically modified in that it comprises at least one fatty acid group.

22. The masonry mortar composition of claim 21 wherein said alkali soluble emulsion polymer comprises a core-shell polymer.

23. Methods for modifying a masonry mortar comprising introducing into a masonry mortar the additive composition of claim 1.

24. Method for making a masonry mortar comprising introducing the additive of claim 1 into the intergrinding of cement clinker.

25. The additive of claim 1 wherein said alkali-soluble emulsion polymer and said humectant are mixed together and provided as one component for adding to a masonry mortar composition.

26. The additive of claim 1 wherein said alkali-soluble emulsion polymer and said humectant are provided in separate containers.

27. The additive of claim 1 wherein said alkali-soluble emulsion polymer and said humectant are provided in one container.

* * * * *